Oct. 29, 1935.  J. OSWIN  2,019,359
PRECISION GAUGE
Filed Dec. 23, 1932
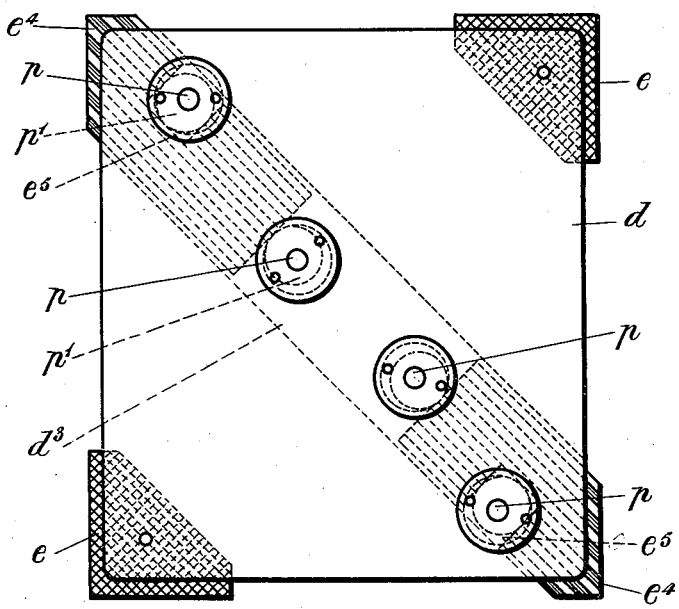
Fig:1.
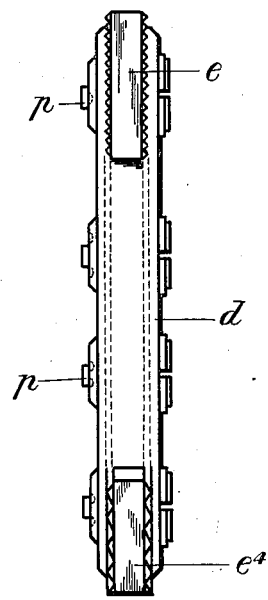
Fig:2.
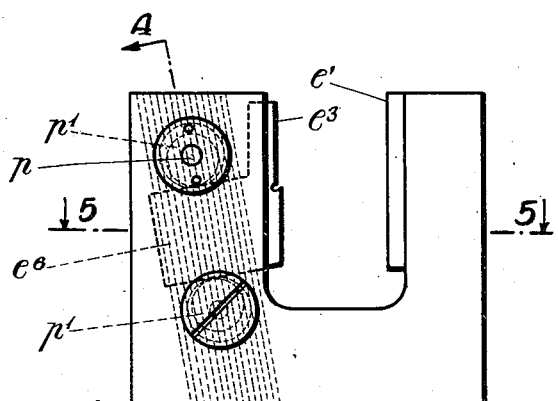
Fig:3.
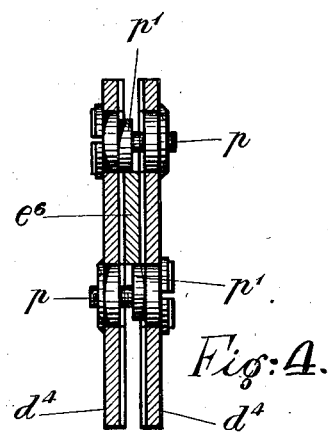
Fig:4.
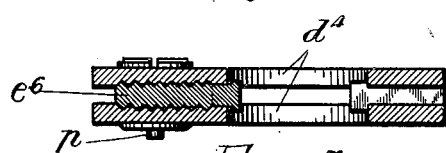
Fig:5.
INVENTOR
John Oswin
by Richard E. Babcock
Attorney Patented Oct. 29, 1935

2,019,359

UNITED STATES PATENT OFFICE 2,019,359

PRECISION GAUGE

John Oswin, Coventry, England

Application December 23, 1932, Serial No. 648,717
In Great Britain December 28, 1931

2 Claims. (Cl. 33—143)

This invention relates to precision and the like gauges such as are employed for the purpose of checking the accuracy of the shape and dimensions of the finished products, more particularly of engineering industries.

The primary object of this invention is to provide in a precision gauge having one anvil or jaw movable with relation to the other means for quickly and very finely or delicately adjusting the position of said movable jaw, and simple means for locking said jaw in any desired position of adjustment.

Figure 1 represents a plan view of a slip gauge embodying my invention;

Figure 2, an edge elevation thereof;

Figure 3, a view corresponding to Figure 1 of a modified form, or gap gauge, embodying my invention;

Figure 4, a sectional view on the line 4—4 of Figure 3; and

Figure 5, a sectional view on the line 5—5 of Fig. 3.

In the embodiment illustrated in Figures 1 and 2, wherein the slip gauge employing the invention is illustrated, two anvils $e$, $e$ which have milled or serrated sides, are permanently fixed at opposite corners of a quadrilateral body $d$ which may be cast about them. The other pair of anvils $e^4$, $e^4$ are adjustable in a diagonal slot $d^3$ cored in the body and are formed at one or both sides with a ridged or rack-like surface which engages with similar surfaces on the sides of the slot, the ridges being formed in the direction in which adjustment is required. The adjustment of the movable anvils can be effected by means of pins $p$ rotatably mounted in the body and having an eccentric portion $p^1$. Each anvil $e^4$ may have a pair of such pins one at the end to form a positive lock and the other occupying a lateral gap $e^5$ in one edge of the anvil for adjustment purposes. The free working edges of the anvils project from the body in two directions thus providing a "go" and "not go" slip gauge of two dimensions for each setting.

Figures 3, 4, and 5 show this form of the invention as applied to a slip gauge of the caliper type. In this case only one pair of anvils is employed, one, $e^1$, being fixed and the other $e^3$, which is stepped at the gauging surface for "go" and "not go" purposes, is adjustable for which purpose it is formed with an extension $e^6$ having ridges and grooves on one or both sides in sliding engagement with corresponding ridges and grooves on the inside surfaces of a pair of plates $d^4$ which together constitute the gauge body. The inclination of the ridges and grooves in the plane of the gauge, is such that, as the adjustable anvil is moved along them, the effect is to give a fine adjustment of the distance between the acting surfaces of the two anvils. The adjustable anvils may be set and locked by means of rotatable pins $p$ as in Figures 1 and 2.

In each of the two embodiments illustrated a double gauge construction is provided for checking the dimensions of work with a given tolerance above or below exact size. In the case of the gauge illustrated in Figures 1 and 2, if the work be within the limits to which the gauge is set, the "go" anvils will fit in the work, but the "not go" anvils must not. In the case of the gauge illustrated in Figs. 3, 4, and 5, if the work be within the limits set the work will pass between the "go" anvils, but must not pass between the "not go" anvils. All work passing these tests will be deemed to be within the allowed tolerance.

I claim:—

1. A precision gauge comprising a pair of related anvils and a body in which said anvils are mounted, said body having a pair of opposed faces each formed with a plurality of alternating ribs and grooves extending at an acute angle with relation to the operative faces of said anvils, and one of said anvils being adjustable with relation to the other and being formed with a portion disposed between said faces of the body and having its faces opposed to said faces of the body respectively formed with a plurality of alternating ribs and grooves slidably interlocking with the cooperating ribs and grooves of the respective opposed faces of said body.

2. A precision gauge comprising an anvil, and a part carrying a complementary anvil, said part having straight ribs and grooves inclined to an imaginary straight line struck between the nearest portions of the operative faces of said anvils, and said first mentioned anvil having a portion formed with similar straight ribs and grooves inclined to said imaginary straight line and slidably interlocking with the corresponding ribs and grooves of said part.

JOHN OSWIN.